United States Patent

[11] 3,584,960

[72] Inventor Nathalie Seailles
Paris, France

[21] Appl. No. 779,792
[22] Filed Nov. 29, 1968
[45] Patented June 15, 1971
[73] Assignee Societe Lignes Telegraphiques Et Telephoniques
Paris, France
[32] Priority Dec. 13, 1967
[33] France
[31] 131,999

[54] APPARATUS FOR THE RELATIVE POSITIONING OF TWO PLANE PARTS

4 Claims, 5 Drawing Figs.

[52] U.S. Cl. .......... 356/164, 356/165, 356/166
[51] Int. Cl. .......... G01b 9/08
[50] Field of Search .......... 356/164, 165, 166, 71

[56] References Cited

UNITED STATES PATENTS

| | | | |
|---|---|---|---|
| 2,780,956 | 2/1957 | Fuller et al. .......... | 356/165 |
| 3,025,749 | 3/1962 | Rodman et al. .......... | 356/239 |

*Primary Examiner*—Ronald L. Wibert
*Assistant Examiner*—T. Major
*Attorney*—Kemon, Palmer & Estabrook

ABSTRACT: Registration of the first planar part is achieved with respect to a test specimen carried by a component holder which is provided with foolproof positioning device for the second planar part. The first planar part is fastened to the component holder, the test specimen is removed and may be replaced by a second part. According to an important feature of the invention, registration of the first planar with the test specimen is monitored through visual inspection of an enlarged display of optical marks carried both by the first part and the test specimen.

APPARATUS FOR THE RELATIVE POSITIONING OF TWO PLANE PARTS

BACKGROUND OF THE INVENTION

The present invention concerns an improved apparatus which is intended to ensure registration between two coplanar parts and more particularly the relative positioning of a mask on a plane surface for the purpose of mass production of circuits or components. Many techniques, such as the technique of thin-film circuits, of semiconductor components, of printed circuits, etc., involve photoengraving steps necessitating the exposure to light of a photosensitive surface through a mask or vacuum evaporation steps taking place through a mask. These steps require correct positioning of the mask in relation to the sensitive surface. It is desirable that this positioning, which must be repeated with each operation, should be as simple as possible in order that it may be carried out in a minimum time and be as error proof as possible. It is obvious that these different conditions are not readily simultaneously met.

In order to satisfy the component manufacturers' requirements to the fullest possible extent, an improved centering apparatus has been developed which ensures accurate registration of a first planar part or mask with respect to a second planar part or component, by means of a very small number of operations and provides optical monitoring which substantially obviates the possibility of incorrect operations.

The present invention is based on the following idea: registration of the first planar part is achieved with respect to a test specimen carried by a component holder which is provided with foolproof positioning device for the second planar part. The first planar part is fastened to the component holder, the test specimen is removed and may be replaced by a second part. According to an important feature of the invention, registration of the first planar with the test specimen is monitored through visual inspection of an enlarged display of optical marks carried both by the first part and the test specimen.

The apparatus according to the present invention is very easy to operate. The displacement of the test specimen with respect to the mask in the course of the setting-up step is checked by the operator on the displayed magnified image, whereby the operation is guided. The precision of the registration is determined by the magnification ratio of the optical system. Since positioning of the second part within the component holder is error proof, the same precision holds in the registration of the first and second parts. It is therefore substantially independent of the operator. The use of at least two sets of different reference marks also prevents reversal of the film supporting the mask or any other ill-location of the mask.

The apparatus according to the present invention have a very wide range of operation, they may be employed regardless of the type of mask used and the size of the component.

DETAILED DESCRIPTION

The description will be more readily followed with reference to the accompanying drawings, in which.

Figure 1:
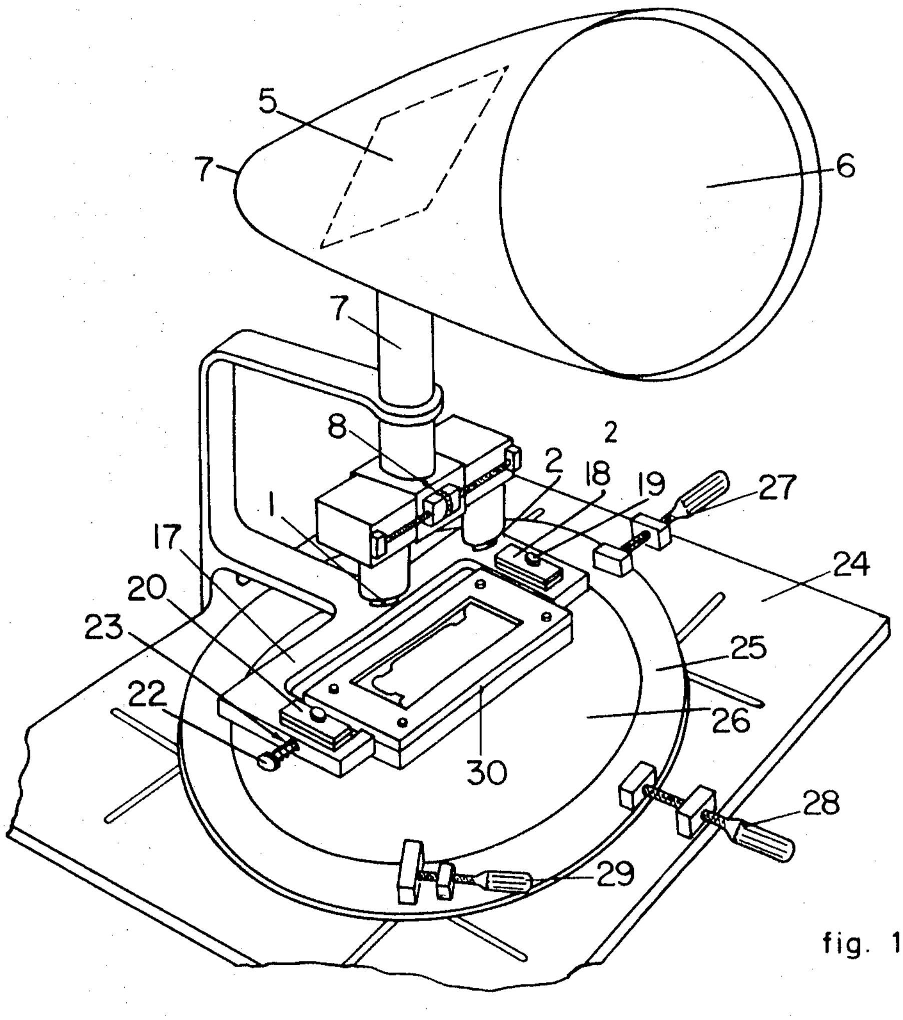
FIG. 1 is a view in perspective of the apparatus.

The embodiment of the apparatus which is being described hereunder is intended for the positioning of a film mask with respect to a component holder design for the planar substrate of a hybrid thin-film or integrated circuit. In the following, the first part will be called "the mask" and the second part "the component."

The optical system comprises (FIGS. 1 and 2) two lenses 1 and 2, a double set of prisms 3 and 4, a mirror 5 and a frosted-glass reading screen 6. This system is mounted in a casing 7 fixed to the flask of the apparatus. The distance between the lenses mounted on two sliding blocks may be adjusted with the aid of a screw thread 8 to the distance *d* between the reference marks provided on the reference base of the masks which is adopted for a given process.

Figure 2:
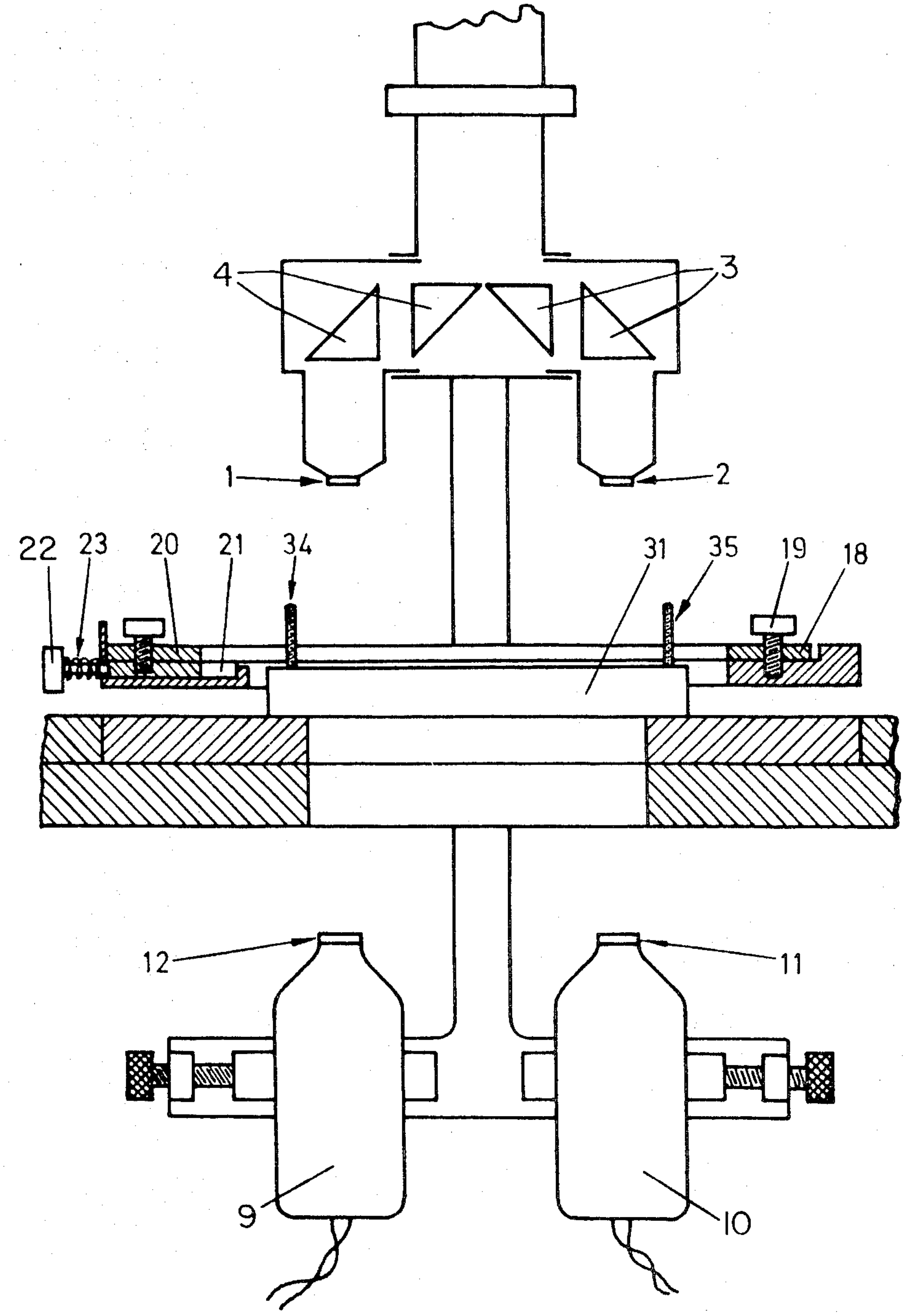
FIG. 2 is a sectional view of a part of the apparatus.
Figure 2A:
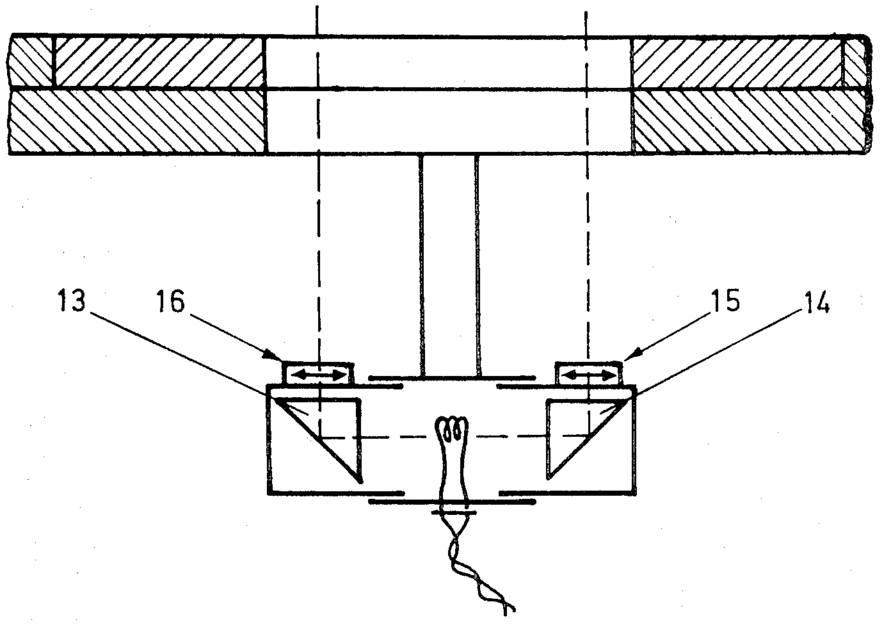

The light sources 9 and 10 (FIG. 2) are fixed to the flask of the apparatus and disposed in the lower part so as to provide two vertical, upwardly directed light beams. Their spacing is adjustable. Each one is provided with a lens 11 and 12 permitting concentration of the rays on the apertures in the reference specimen. In another embodiment of the apparatus (FIG. 2*a*), only one light source is used. Two prisms or mirrors 13 and 14 and two lenses 15 and 16 mounted on sliding tubes reflect upwardly two light beams of equal intensity.

The component holder will be positioned with respect to the mask. In order to secure the mask (FIG. 1) to the flask during operation, an U-shaped clamp 17 is provided. It comprises (FIGS. 1 and 2) at one end a stationary jaw 18, of which may be tightened by a nut 19, and at the other end a movable jaw 20 adapted to slide within a groove 21 in the width of the arm of the clamp. A pin 22 is provided to push the said jaw towards the center of the clamp. A drawback spring 23 tends to return it into the rest position and to maintain it therein. This clamp is intended for provisional securing of the mask. The component carriage 30 is secured to the inner disc 26 of the movable part of the crossed-slide table 24 (FIG. 1). Outer annulus 25 is adapted to be moved in two orthogonal directions under the action of micrometer screws 27 and 28 while carrying inner disc 26. Inner disc 26 may in addition undergo a rotational movement, limited to about 10°, under the action of the micrometer screw 29. The said plates (FIG. 2) are apertured at their center to permit the passage of the light beams. The component supporting carriage 30 is maintained on the inner disc 26 with the aid of abutments provided on the said plate (not shown).

The component supporting carriage 30 (FIG. 3) comprises an apertured component holder 31 provided with four screw-threaded pins 32, 33, 34, 35. The said holder is so cut out as to provide seatings 36 and 37 for one of the ends of two springs 38 and 39 on two adjoining sides of the inner aperture. These springs serve to maintain in position, first the test specimen 40 and then the components after completion of the registering operation for further processing of said component. The positioning of the test specimen within the aperture and that of the component which will take the place thereof later on, is determined by three abutments 41, 42 and 43, which form a reference right angle. Two V-shaped grooves 44 and 45 (FIG. 3) adapted to receive a retaining joint are formed in the upper surface of the holder on which is to be clamped the mask frame 46.

The frame 46 is fitted to the said holder by means of four knurled nuts 47, 48, 49, 50 engaged on the screw-threaded pins 32, 33, 34, 35. The mask will be held fast between the holder and the movable frame after having been positioned. The frame is made of perforated metal in the case of the positioning of a mask intended for vacuum evaporation. It may consist of perforated metal or of a transparent material in the case of the positioning of a photographic mask.

Figure 3:
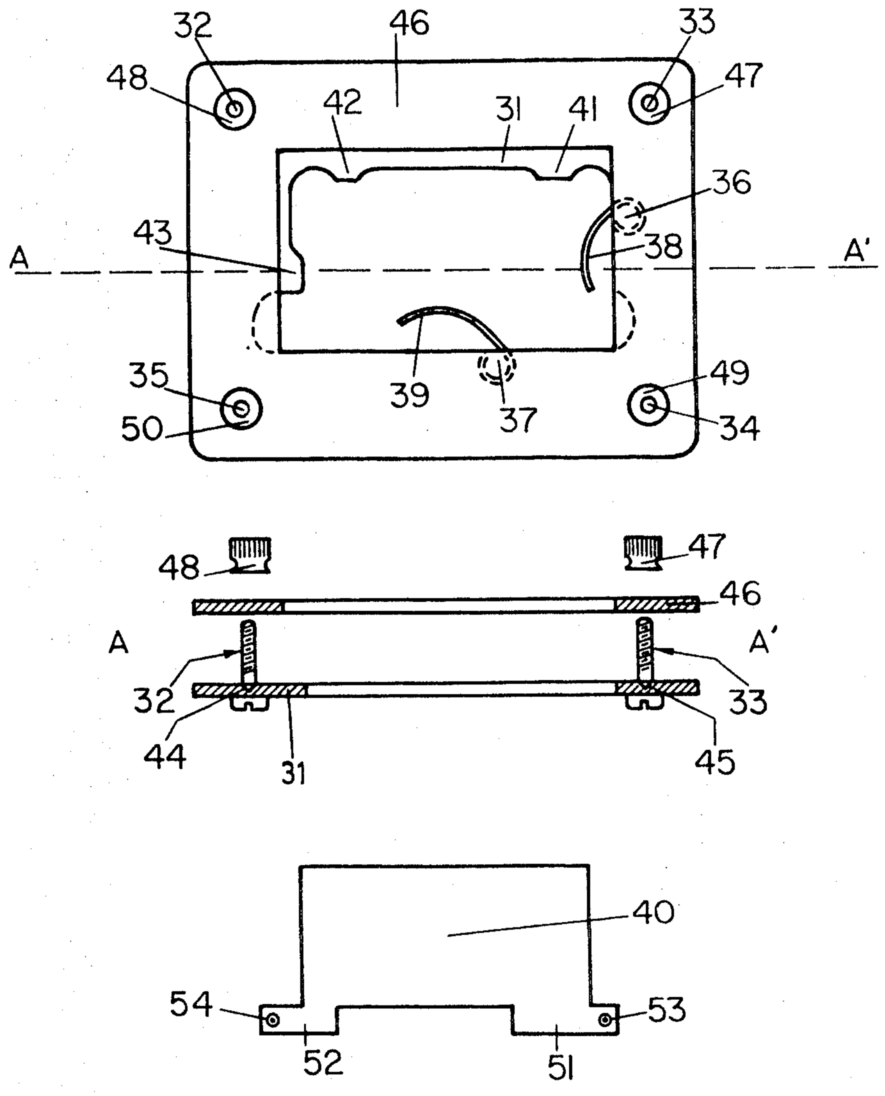
FIG. 3 is a plan view of a frame supporting the parts and of a test specimen.

The test sample 40 is shown at the bottom of FIG. 3. It is a metal plate having the same dimensions as the components to be processed and carrying two shoulders 51 and 52 formed with two accurately drilled circular holes 53 and 54. The distance between these holes is made equal to the length of the reference length *d* marked on the masks.

Figure 4:
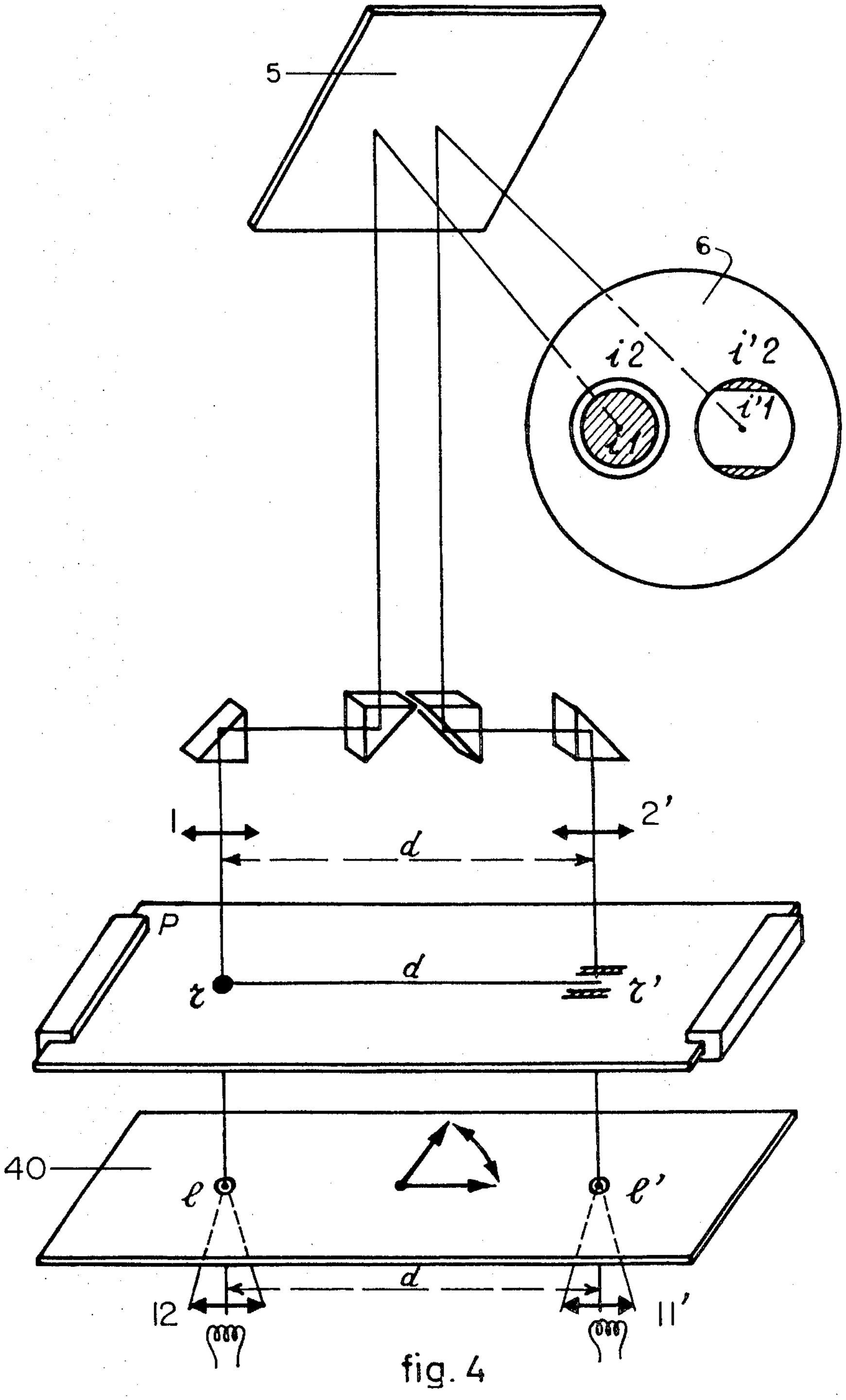
FIG. 4 illustrates the operation.

The operation of the apparatus is illustrated in FIG. 4. In order to register a mask relative to the same component holder, the following procedure is adopted. The apparatus is first adjusted to bring into registration the optical axes of the lenses 1 and 2' with those of the lenses of the sources 12 and 11' and to bring their spacing to a value *d* equal to the length of the reference length marked on the mask. Correct adjustment, which need not be very precise due to the relatively large width of the light beams with respect to the diameter of the holes 53—54 in the test sample, can readily be verified by checking the distance between the image of the sources 12 and 11 on the screen 6. The test sample 40, is thereafter introduced into the component holder. The said holder, without its frame, is disposed on the crossed-slide table. The mask P is then engaged by one of its edges and gripped between the jaws 18 of the fixed clamp of the mask-securing and tensioning clamp. The opposite edge of the mask is disposed between the jaws 20 of the movable clamp, which jaws will be tightened only after complete compression of the drawback spring, so as to provide the tensioning of the mask.

The positioning of the mask in its clamp is easier if the precaution has been taken to cut out the mask with the aid of a template. This arrangement is sufficient to position the reference marks $r$ and $r'$ in the light beams and in the field of lenses 1 and 2'. When the mask has been secured, the positioning is effected. By actuation of the annulus and disc of the crossed-slide table, the component holder and the test sample 40 is moved in relation to the mask P, until the images $i_1$ and $i'_1$ of the marks $r$ and $r'$ appear on the screen 6 as exactly circumscribed by the images $i_2$ and $i'_2$ of the holes in the test sample.

According to a preferred arrangement, the mask bears two different reference marks, the nature of which depends upon the type of mask being used. On a photographic film, for example, a shaded circle may be chosen as the reference mark $r$. The diameter of this circle is made such that, it is smaller than the hole in T, and taking into account the optical magnification of the apparatus, the annulus separating the images $i_1$ and $i_2$ on the screen has a width of half a millimeter. The reference mark $r'$ may consist of two parallel shaded strips separated by a distance such that, taking into account the magnification of the apparatus, the sagittas of the two sectors appearing shaded on the image $i'_2$ are each equal to half a millimeter. It is obvious that these particular shapes of the marks do not limit the invention. For the centering of metallic masks which must be so cut out as to permit the passage of the light beams, the shape of the reference marks will have to be different and so chosen as not to reduce too much the strength of the metallic film.

It is necessary to make the images of the two light beams closer, as shown in FIG. 4 and as is well known prisms may be used to this object. Indeed, due to magnification the two images would be so wide apart as to render simultaneous inspection on a single screen impractical.

It is to be noted that, depending upon the operating conditions, it is possible to color the light sources in order to facilitate the checking of the adjustment on the screen. For instance the space between the circles $i_1$ and $i_2$ will appear red, on the screen E if the source S is provided with a red filter.

When correct centering is reached, the mask is fixed on the component holder by positioning the movable frame and tightening the four knurled fixing nuts. The retaining joint engaged in the grooves in the component holder ensures that the mask is held fast in the carriage.

Then the mask-fixing clamps 18 and 20 (FIG. 1) are slackened, the component carriage is withdrawn from the apparatus and the test specimen is removed. The component is inserted instead.

The apparatus just described affords the advantage that it only requires performing simple and rapid operations. It can readily be incorporated in a production line and allows mass operation since it permits use of many identical masks. The double optical system with which it is provided brings the images to an appropriate distance apart on the projection screen. The reading is simple and does not entail any fatiguing of the operators, who can thus preserve their faculties of assessment. The precision of the apparatus depends only upon the magnification of the optical system and upon the precision with which the reference marks have been applied, particularly the holes in the test specimen.

What I claim is:

1. An apparatus for the registration of a first planar part carrying two identification marks spaced a distance $d$ apart with a second planar part comprising means for generating two parallel light beams, means to adjust the distance between the two beams to said value $d$, means to magnify the images of said two beams, means to bring such images closer with respect to one another, a viewing screen to display such images, clamping means to fix the first of said planar part with respect to the apparatus across both said light beams, movable carriage means for said second part comprising a movable holder located on one side of said first part and a removable frame located on the other side of said first part, positioning means to fix said second part within said holder across said two light beams, two drilled holes in said second part spaced by $d$, mechanical means to displace said carriage until the images of said holes are superimposed on said viewing screen with the images of marks carried by said first part.

2. An apparatus for the registration of a first planar part carrying two identification marks spaced a distance $d$ apart with a second planar part comprising means for generating two parallel light beams, means to adjust the distance between the two beams to said value $d$, means to magnify the images of said two beams, means to bring such images closer with respect to one another, a viewing screen to display such images, clamping means to fix the first of said planar part with respect to the apparatus across both said light beams, movable carriage means for said second part comprising a holder made of a rectangular frame carrying three abutments on two adjacent sides of its inner periphery and one pushing spring attached to each of the other sides, located on one side of said first part and a removable frame located on the other side of said first part, two drilled holes in said second part spaced by $d$, mechanical means to displace said carriage until the images of said holes are superimposed on said viewing screen with the images of marks carried by said first part.

3. An apparatus for the registration of a first planar part carrying two identification marks spaced a distance $d$ apart with a second planar part comprising means for generating two parallel light beams, means to adjust the distance between the two beams to said value $d$, means to magnify the images of said two beams, means to bring such images closer with respect to one another, a viewing screen to display such images, claiming means to fix the first of said planar parts with respect to the apparatus across both said light beams, movable carriage means for said second part comprising a movable holder located on one side of said first part and a removable frame located on the other side of said first part, positioning means to fix said second part within said holder across said two light beams, two drilled holes in said second part spaced by $d$, a crossed-slide table secured to said apparatus controlling a first annular plate and a second circular disc inside said first annular plate, means to rotate said circular disc inside said annulus until the images of said holes in said second part are superimposed on said viewing screen with the images of marks carried by said first part.

4. An apparatus for the registration of a first planar part carrying two identification marks spaced a distance $d$ apart with a second planar part comprising means for generating two parallel light beams, means to adjust the distance between the two beams to said value $d$, a colored filter across each of said light beams, means to magnify the images of said two beams, means to bring such images closer with respect to one another, a viewing screen to display such images, clamping means to fix the first of said planar part with respect to the apparatus across both said light beams, movable carriage means for said second part comprising a movable holder located on one side of said first part and a removable frame located on the other side of said first part, positioning means to fix said second part within said holder across said two light beams, two drilled holes in said second part spaced by $d$, mechanical means to displace said carriage, until the images of said holes are superimposed on said viewing screen with the images of marks carried by the said first part.